Oct. 20, 1925.
H. STERNBERGH
1,558,308
VEHICLE ANCHORAGE DEVICE
Filed Nov. 10, 1924
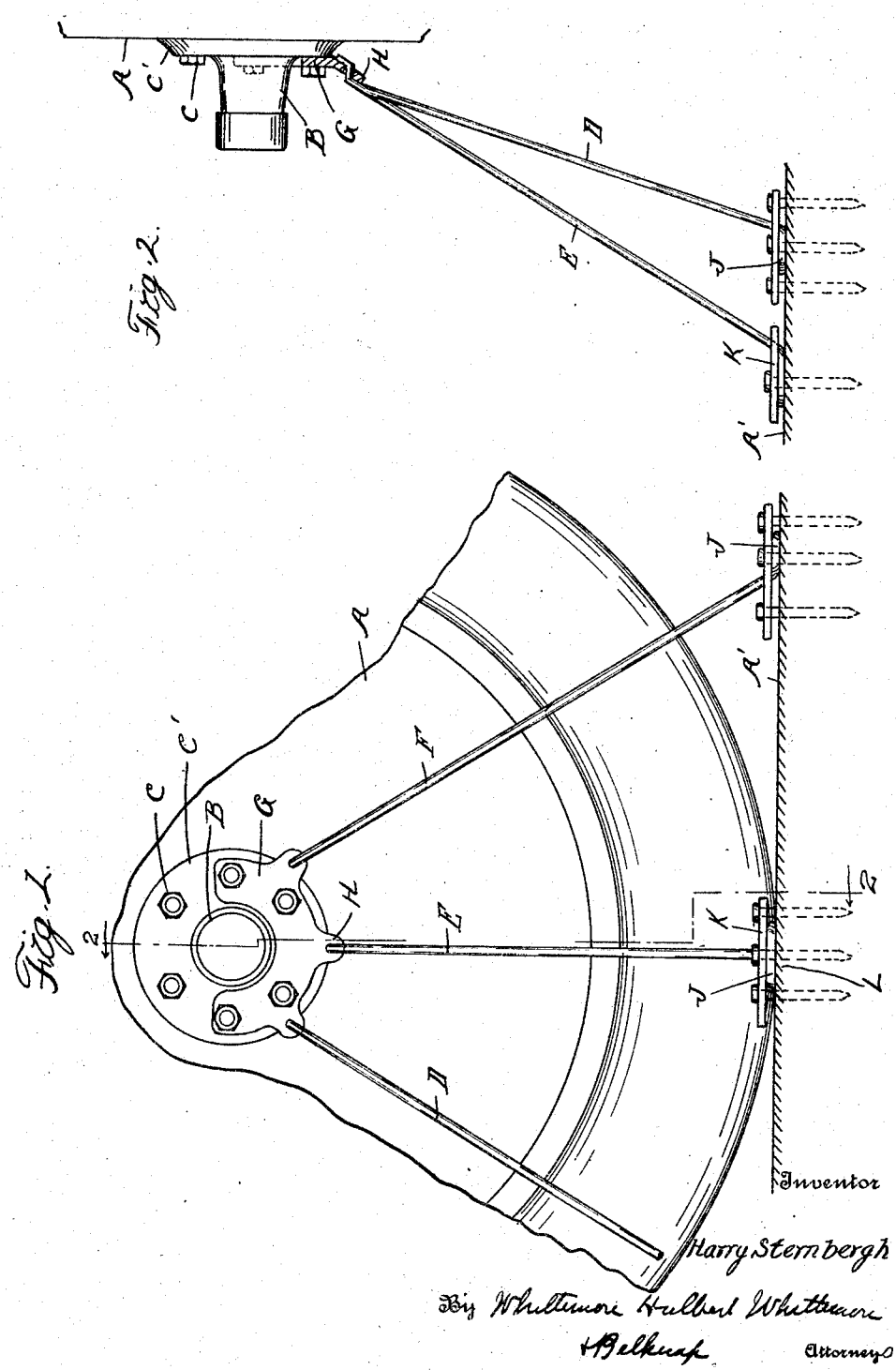

Patented Oct. 20, 1925.

1,558,308

UNITED STATES PATENT OFFICE.

HARRY STERNBERGH, OF DETROIT, MICHIGAN, ASSIGNOR TO WILLIAM W. BLAKELY, OF DETROIT, MICHIGAN.

VEHICLE ANCHORAGE DEVICE.

Application filed November 10, 1924. Serial No. 749,041.

*To all whom it may concern:*

Be it known that I, HARRY STERNBERGH, a citizen of the United States of America, residing at Detroit, in the county of Wayne and State of Michigan, have invented certain new and useful Improvements in Vehicle Anchorage Devices, of which the following is a specification, reference being had therein to the accompanying drawings.

This invention relates to vehicle anchorage devices for holding a vehicle properly positioned within a freight car or other carrier.

The invention consists in an improved means for attaching the tie member of an anchorage device to the hub portion of a wheel, and in various other features hereinafter set forth.

In the drawings:

Figure 1 is a side elevation of the improved anchorage means engaging a vehicle wheel.

Fig. 2 is a vertical sectional view of the same on line 2—2 of Fig. 1.

In these views the reference character A designates a wheel of a vehicle undergoing shipment within a freight car or the like, the floor of the latter being indicated at A'. The hub B of said wheel is secured to the wheel body by a plurality of bolts C, as is common practice, said hub having the usual flange C' for engagement by said bolts.

The anchorage device constituting the present invention comprises three tie members D, E, and F and a semi-circular plate G to which the upper ends of said tie members are secured, and which is attached to the flange C' beneath the hub B by certain of said bolts C. H designates radial lugs formed upon the plate G for engagement by the tie members D, E and F. The lower ends of said tie members are bent to form feet J upon which are superposed anchorage plates K nailed to the floor A' as indicated at L, and holding said feet fixed upon the floor.

The described invention, by utilizing the bolts C as an attachment means for the plate G, effects an economy of material and establishes a very secure connection of the tie members to the wheel.

It is to be understood that the plate G may be proportioned for engagement by any desired number of said bolts C.

The function of the tie member E, which extends downwardly in substantially the vertical plane of the axis of the wheel A, is primarily to resist stresses acting laterally upon the anchored vehicle, whereas the tie members D and E, which have a considerable incline forward and back as they extend downwardly, act primarily to resist stresses acting longitudinally of the vehicle. The connections of the tie members D, E and F to the lugs H are preferably pivotal so that said connections may conform to a slight movement of the vehicle responsive to the aforementioned stresses.

What I claim as my invention is:—

1. In an anchorage device for vehicles, the combination with a vehicle wheel having a body portion, a hub portion and fasteners securing said hub portion to the body portion, of a tie member for holding said wheel from movement, and a member connected to said tie member secured by said fasteners to said wheel.

2. In an anchorage device for vehicles, the combination with a vehicle wheel having a hub member and having fasteners securing said hub member to said wheel, of a tie member substantially holding said wheel from movement during shipment of the vehicle, and secured to the wheel by one of said fasteners.

3. In an anchorage device for vehicles, the combination with a vehicle wheel having a body portion, a hub portion, and fasteners securing said hub portion to the body portion, of a stamped sheet metal plate attached to said wheel by a plurality of said fasteners, and a tie member extending from said plate to a support for the wheel.

4. In an anchorage device for vehicles, the combination with a vehicle wheel having a body portion, a hub portion, and fasteners securing said hub portion to the body portion of said wheel, of a tie member for holding said wheel from movement secured to said wheel by one of said fasteners.

5. In an anchorage device for vehicles, the combination with a vehicle wheel having a body portion, a hub portion, and fasteners securing said hub portion to said body portion, of anchorage means for said wheel secured to said hub portion by a plurality of said fasteners.

6. The combination with a wheel having a body portion, a hub portion, and bolts securing the hub portion to the body portion, of an anchorage device for the wheel including a plate secured to the hub by one of said bolts, and a tie member secured to said plate.

In testimony whereof I affix my signature.

HARRY STERNBERGH.